United States Patent
Darrington et al.

(10) Patent No.: US 9,052,835 B1
(45) Date of Patent: Jun. 9, 2015

(54) ABORT FUNCTION FOR STORAGE DEVICES BY USING A POISON BIT FLAG WHEREIN A COMMAND FOR INDICATING WHICH COMMAND SHOULD BE ABORTED

(71) Applicant: HGST Netherlands B.V., Amsterdam (NL)

(72) Inventors: David Lee Darrington, Rochester, MN (US); Dylan Mark Dewitt, Rochester, MN (US); Adam Michael Espeseth, Rochester, MN (US); Lee Anton Sendelbach, Rochester, MN (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/136,351

(22) Filed: Dec. 20, 2013

(51) Int. Cl.
*G06F 12/00* (2006.01)
*G06F 3/06* (2006.01)

(52) U.S. Cl.
CPC .............. *G06F 3/0659* (2013.01); *G06F 3/061* (2013.01); *G06F 3/0679* (2013.01)

(58) Field of Classification Search
USPC ................... 710/3–5, 14–19, 52–54; 712/228
See application file for complete search history.

(56) References Cited

U.S. PATENT DOCUMENTS

| | | | |
|---|---|---|---|
| 2006/0149940 A1* | 7/2006 | Mukherjee | 712/228 |
| 2009/0327638 A1* | 12/2009 | Buch | 711/166 |
| 2012/0110259 A1 | 5/2012 | Mills et al. | |
| 2013/0086311 A1 | 4/2013 | Huang et al. | |
| 2013/0135816 A1 | 5/2013 | Huang | |
| 2013/0145085 A1 | 6/2013 | Yu et al. | |
| 2013/0198311 A1 | 8/2013 | Tamir et al. | |
| 2014/0215191 A1* | 7/2014 | Kanapathipillai et al. | 712/220 |
| 2014/0281040 A1* | 9/2014 | Liu | 710/3 |

FOREIGN PATENT DOCUMENTS

WO WO 2013/095562 A1 6/2013

OTHER PUBLICATIONS

Marks et al., "NVM Express—The interface standard for PCI express SSDs," Flash Memory Summit 2011, Santa Clara, CA. http://www.flashmemorysummit.com/English/Collaterals/Proceedings/2011/20110809_S107_Onufryk.pdf.
NVM Express, "NVM Express Overview," 2013. http://www.nvmexpress.org/about/nvm-express-overview/.
UNH-IOL NVMe Test Consortium, "Test plan for NVMe Conformance Version 1.0 Technical Document," (May 7, 2013). https://www.iol.unh.edu/services/testing/NVMe/testsuites/NVMe_Conformance_Test_Suite_v1.0.pdf.
"NVM Express Explained." http://www.nvmexpress.org/wp-content/uploads/2013/04/NVM_whitepaper.pdf.
Gaysse, J., "Designing a NVMe compliant PCIe SSD," http://www.chipestimate.com/tech-talks/2012/12/18/IP-Maker-Designing-a-NVMe-compliant-PCIe-SSD.

* cited by examiner

*Primary Examiner* — Tammara Peyton
(74) *Attorney, Agent, or Firm* — Billion & Armitage; Michael A. Collins

(57) ABSTRACT

An abort function for storage devices sets a "poison bit" flag in the command to be deleted while the command resides on a submission queue prior to being fetched by the SSD controller. In response to the set "poison bit" flag, a storage device controller aborts execution of the I/O command and returns an abort successful status reply to the completion queue.

20 Claims, 3 Drawing Sheets

ABORT FUNCTION FOR STORAGE DEVICES BY USING A POISON BIT FLAG WHEREIN A COMMAND FOR INDICATING WHICH COMMAND SHOULD BE ABORTED

TECHNICAL FIELD

This disclosure relates to computer systems and in particular to computer systems utilizing storage devices.

BACKGROUND

As central processing units (CPUs) continue to get faster, the memory units that supply the data to the CPUs must continually get faster as well. In a typical computer system, a variety of different memory devices are employed to meet the needs of a particular application, wherein each memory device provides a trade-off in storage capacity, cost and response time. System performance is maximized by utilizing the devices in a hierarchy arrangement, utilizing both extremely fast, but low-capacity memory devices in combination with slower, higher capacity memory devices. The memory hierarchy would include both on-chip memory devices (e.g., processor registers, caches, etc.) as well as off-chip memory devices (e.g., main memory devices and disk storage). For example, a computer system may employ a hard disk drive (HDD) as the disk storage device and a dynamic random access memory (DRAM) as the main memory. The hard disk drive provides cheaper storage (i.e., cost/GB), and higher capacity, but slower response time. In contrast, the DRAM device provides faster response time, but at higher cost and lower capacity.

In recent years, non-volatile memory (NVM) devices in the form of solid-state drives have been employed as a complementary type of disk storage, used either instead of or in conjunction with a HDD. The NVM devices provide faster response time than a typical HDD, but at a slightly higher cost per gigabyte (GB). Both are located "off-board", and therefore communicate with the CPU via a data bus. As such, HDD and NVM devices are often referred to as an "Input/Output (I/O) Memory Tier", because they require input/output operations to communicate with the CPU.

Although a variety of data buses are available to provide communication between CPUs and SSD devices, the peripheral component interconnect express (PCIe) type data bus has emerged as a good candidate because of the throughput (e.g., 16 GB/s plus) capable of being provided. A communication interface known as NVM express (NVMe) has been proposed to enable host computer systems to communicate with SSD devices via a PCIe (or equivalent) bus. The interface provides an optimized command issue and completion path. Included in the NVMe interface is an "abort" command that allows commands issued by the host system to be aborted, rather than executed. However, issuance of the abort command according to the NVMe standard only addresses a small subset of possible scenarios. It would therefore be beneficial to develop an abort command that operates within the framework of the NVMe standard, but is applicable to a wider range of possible scenarios.

SUMMARY

Described herein is a method of executing an abort command in a system including a host communicating with a storage device. The method includes storing a input/output (I/O) command in an I/O submission queue located in system memory. In response to an abort command being received with respect to I/O command placed on the I/O submission queue, a "poison bit" within the I/O command is set, indicating that the I/O command should be aborted. Subsequently, the I/O command is fetched by a storage device controller included as part of the storage device. The storage device controller detects the set "poison bit" within the I/O command and in response stops execution of the I/O command. The storage device controller returns a result to an I/O completion queue located in system memory indicating the abort was successful.

Described herein is a host computer system that interacts with a storage device. The host computer system includes an an input/output (I/O) submission queue, implemented in system memory, that stores I/O commands to be fetched by a storage device controller in the storage device. The host computer system further includes an I/O completion queue, implemented in the system memory, that stores results provided by the storage device controller indicating execution of a I/O command. The host computer system also includes a device driver, executed by a processor in the host computer system, that places I/O commands onto the I/O submission queue and reads results provided onto the I/O completion queue. In response to an abort command issued by the host computer system, the device driver locates the command to be aborted within the I/O submission queue and sets an "poison bit" flag in the I/O command.

Described herein is computer system that includes an input/output (I/O) submission queue, an I/O completion queue, a device driver, and a storage device. The I/O submission queue and the I/O completion queue are implemented in system memory. The device driver, executed by a processor in the host computer system, places I/O commands onto the I/O submission queue and reads results provided onto the I/O completion queue. In response to an abort command issued by the host computer system, the device driver locates the I/O command to be aborted within the I/O submission queue and sets a "poison bit" flag in the I/O command. The storage device includes a storage device controller that implements an internal queue for storing I/O commands fetched from the I/O submission queue awaiting execution. The storage device controller fetches I/O commands from the I/O submission queue and places them into the internal queue if the "poison bit" flag is not set, wherein the storage device controller provides an abort successful result to the I/O completion queue if the "poison bit" flag is set.

Described herein is a method of operating a device driver on a host side of a non-volatile memory express (NVMe) interface system. The method includes receiving an input/output (I/O) command from the host computer system, and placing the received I/O command on an I/O submission queue. In response to an abort command received from the host computer system, the method includes locating the I/O command within the I/O submission queue and setting a "poison bit" flag within the command to be aborted.

Described herein is a computer readable medium that stores instructions for implementing a device driver, wherein execution of the stored instructions by a processor implements a method for accessing a storage device. The method implemented includes receiving an input/output (I/O) command from the host computer system, and placing the received I/O command on an I/O submission queue. In response to an abort command received from the host computer system, the method includes locating the I/O command within the I/O submission queue and setting a "poison bit" flag within the command to be aborted.

DETAILED DESCRIPTION

The present invention provides a method of aborting commands within the NVMe communication standard. In particular, the present invention allows a device driver associated with the host system to access a submission queue storing the command to be aborted, and write a "poison" bit that indicates to the controller that the command should be aborted rather than executed. In this way, execution of the abort function is provided within the command issue and completion path, rather than external to it.

Figure 1:
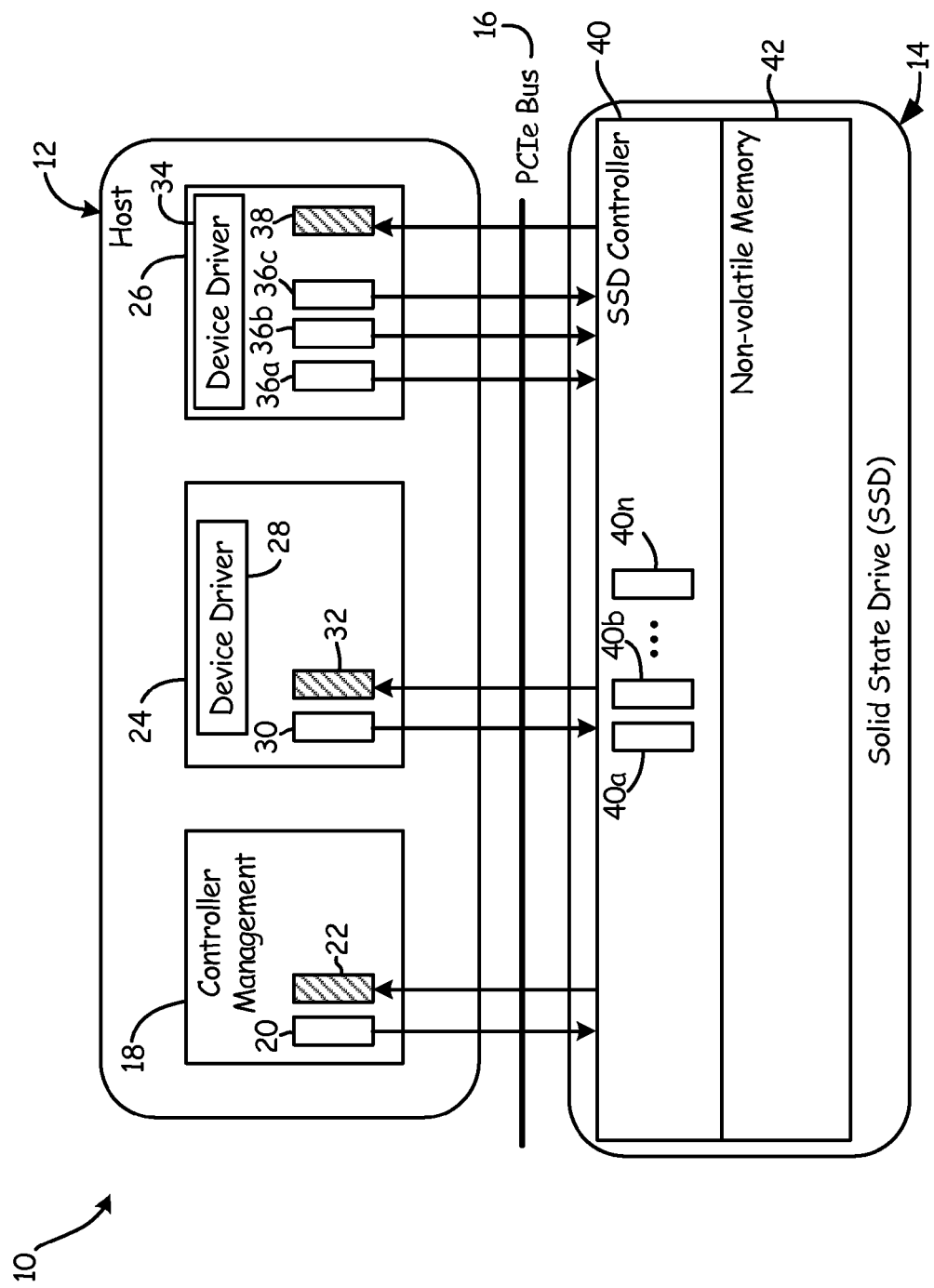
FIG. 1 is a block diagram of a computer system including a host connected to a storage device that utilizes the NVMe standard according to an embodiment of the present invention.

FIG. 1 is a block diagram of computer system 10 including host 12 connected to storage device 14. In the embodiment shown in FIG. 1, storage device 14 is a solid-state storage device (SSD), although in other embodiments storage device may utilize other well-known storage techniques such as magnetic recording employed in hard disk drives (HDD). Communication between host 12 and SSD 14 is via data bus 16 (e.g., peripheral component interconnect express (PCIe) bus), and operates within the framework of the non-volatile memory express (NVMe) communication interface. In general, the NVMe communication interface makes use of a submission/completion queue pairs located on the host side for submitting SSD requests. SSD 14 fetches commands from the submission queue, executes the fetched command, and returns results to the completion queue.

In the embodiment shown in FIG. 1, host 12 includes one or more central processing units (CPUs) and memory (e.g., cache memory). In addition to other responsibilities, CPUs and cache memory, or partitions thereof, provide for the implementation of the NVM interface on the host side, including the data structures required to implement the NVM interface. For example, in the embodiment shown in FIG. 1, the NVM interface includes controller management module 18, including administration submission queue 20 and administration completion queue 22, and first and second CPU partitions 24 and 26. CPU partitions may represent a single processor partitioned into one or more sectors, a single processor with multiple cores, or a plurality of processors. Included within each partition is a device driver, a submission queue(s), and a completion queue. For example, first partition 24 includes device driver 28, I/O submission queue 30 and completion queue 32. Second partition 26 includes device driver 34, I/O submission queues 36a, 36b, and 36c, and completion queue 38. As illustrated in the embodiment shown in FIG. 1, a plurality of submission queues (e.g., 36a, 36b, and 36c) may be associated with a single completion queue. In other embodiments, each partition may additional include a plurality of completion queues, the only requirement being that each submission queue be associated with a completion queue. Device driver 28 is stored on a computer readable medium associated with host 12, and executed by the processor associated with first partition 24. Similarly, device driver 34 is stored on a computer readable medium associated with host 12, and executed by the processor associated with second partition 26.

SSD drive 14 includes SSD controller 40 and non-volatile memory (NVM) 42. For example, NVM 42 may be implemented with NAND-type non-volatile memory. In addition, SSD controller 40 includes a plurality of internal execution queues 40a-40n, wherein 'n' represents any number of queues up to an allowed maximum.

Figure 2:
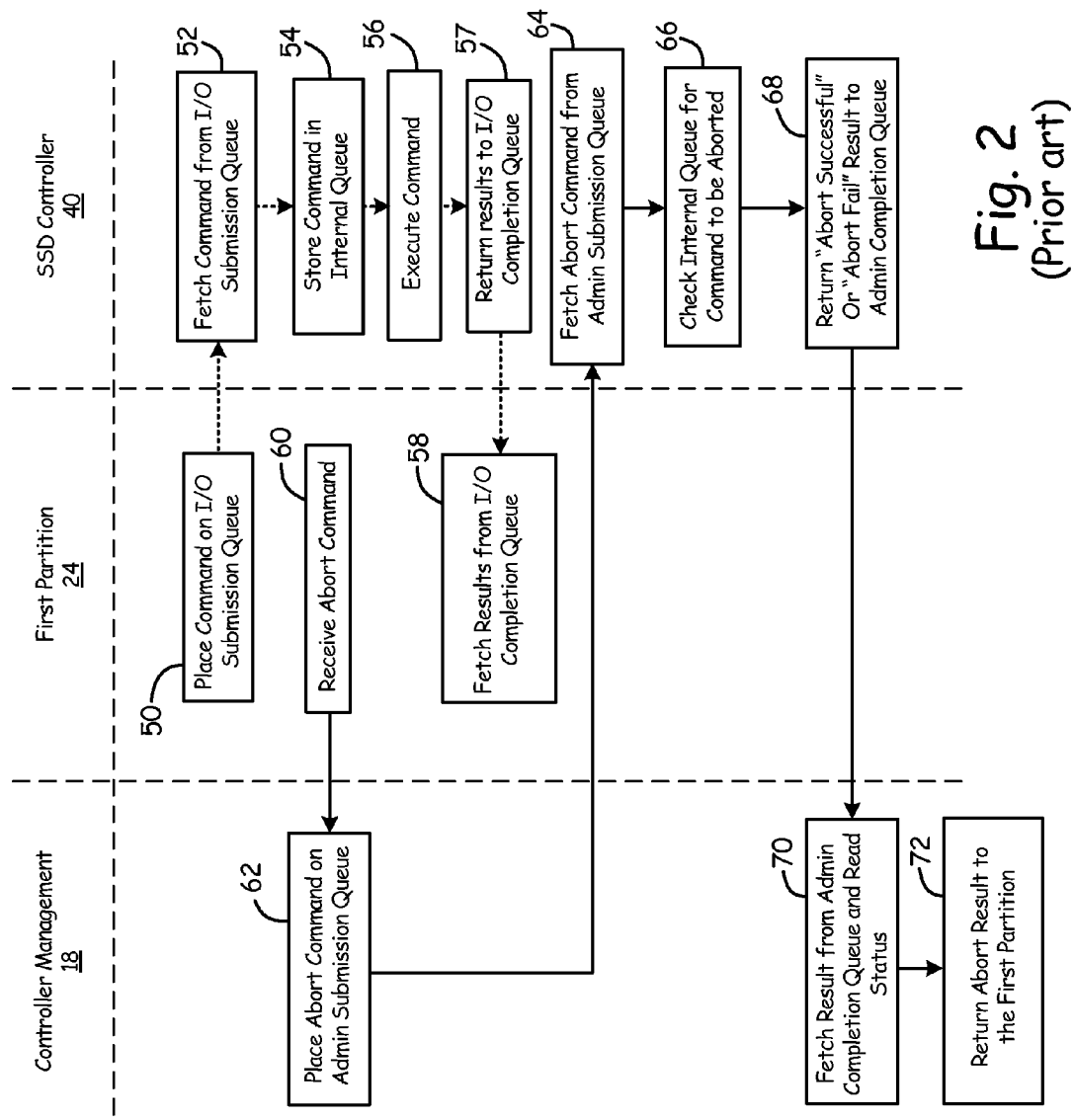
FIG. 2 is flowchart illustrating execution of the administrative abort command as described in the NVMe standard as known in the prior art.
Figure 3:
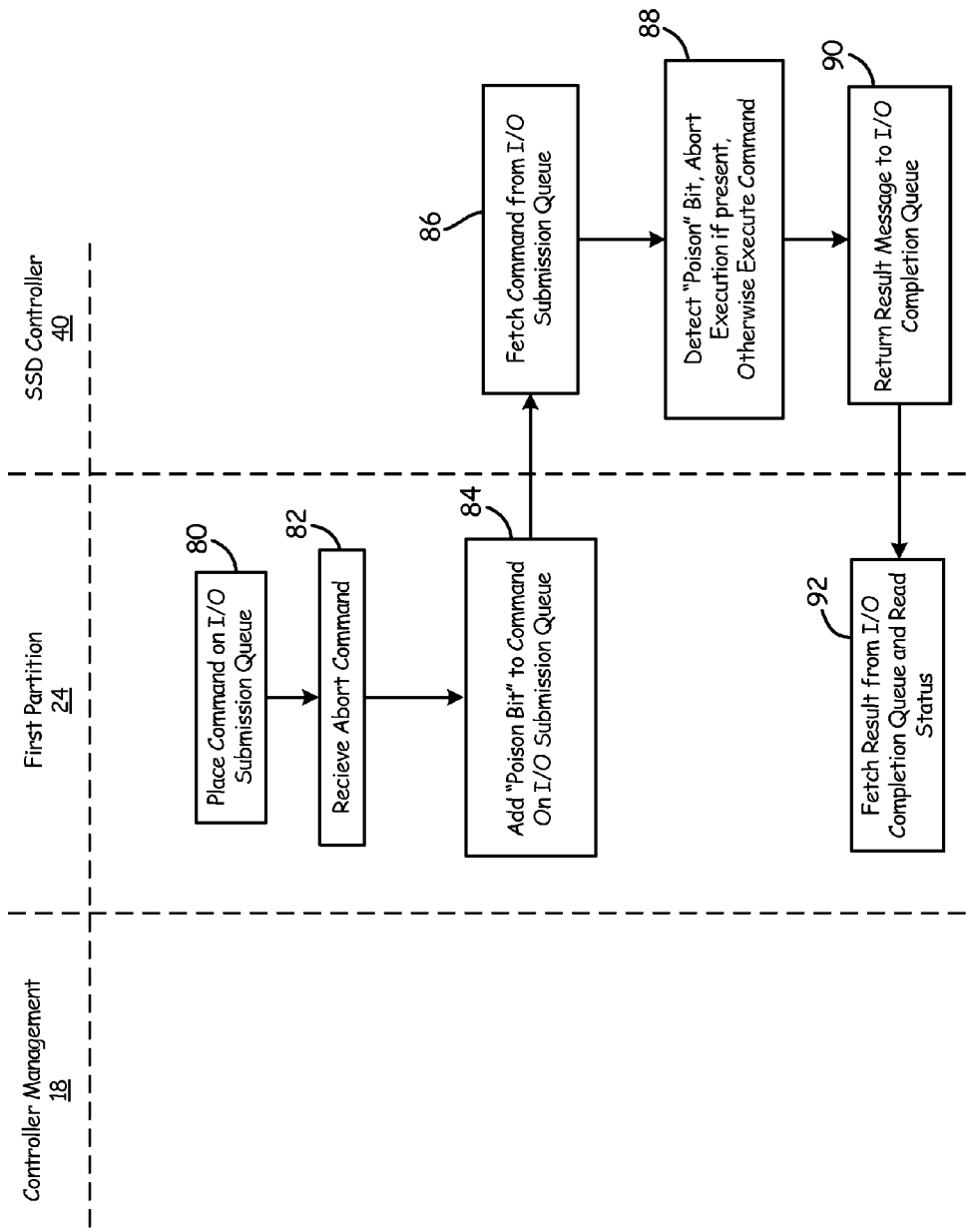
FIG. 3 is a flowchart illustrating execution of the command path abort command according to an embodiment of the present invention.

FIGS. 2 and 3 are flowcharts illustrating communication between host 12 and SSD 14, including implementation of different types of abort functions. FIG. 2 illustrates execution of a standard abort function as currently implemented by the NVMe interface, referred to herein as a standard, administrative abort. FIG. 3 illustrates execution of the "poison bit" abort function according to an embodiment of the present invention, referred to herein as a command path abort function.

With respect to FIG. 2, execution of a typical I/O command is illustrated with dashed lines, while execution of the standard administrative abort command within the NVMe framework is illustrated with solid lines. The administrative abort command may be generated at any time after placement of the I/O command on the I/O submission queue and prior to placement of the status update on the completion queue. Finally, execution of the I/O command is described with reference to first partition 24, although the same principles would apply to second partition 26 or other partitions.

At step 50, the I/O operation between host 12 and SSD 14 is initiated by placing an I/O command on I/O submission queue 30. For example, the command may be a read command or a write command, and may specify the memory location associated with SSD 14 to be read or written to. In addition, at this step device driver 28 provides an indication to SSD controller 40 that I/O submission queue 30 has a command ready to be fetched (referred to as a "doorbell ringer"). In one embodiment, I/O submission queue 30 is a circular buffer maintained by a head pointer and a tail pointer (neither of which is shown). Commands fetched from I/O submission queue 30 are fetched in the order they are placed in the queue. However, SSD controller 40 may change the order in which the commands are executed.

At step 52, SSD controller 40 fetches the I/O command from I/O submission queue 30. At step 54, SSD controller 40 stores the fetched command in one of the internal queues 40a-40n. At step 56, SSD controller 40 executes the I/O command from one of the stored internal queues 40a-40n. At step 57, having completed execution of the I/O command, SSD controller 40 returns a result to I/O completion queue 32. For example, the result may indicate whether the command was executed successfully or not. At step 58, first partition 24 fetches the result from I/O completion queue 32 and reads the results.

At step 60, an administrative abort command is generated by first partition 24 with respect to an I/O command placed on I/O submission queue 30 (shown at step 50). The administrative abort command is generated at some point between placement of an I/O command on submission queue 30 and fetching a result from I/O completion queue 32 at step 58.

At step 62, in response to the administrative abort command generated by first partition 24, controller management module 18 places the administrative abort command on administration submission queue 20 within controller management module 18. At step 64, SSD controller 40 fetches the administrative abort command from administration submission queue 20. At step 66, SSD controller 40 checks internal queues 40a-40n for the I/O command to be aborted. If the I/O command is located within one of the internal queues 40a-40n, SSD controller 40 determines whether it is practical to stop execution of the command. In some instances, execution of the I/O command may already have been initiated, and it may be better to allow the I/O command to complete execution. In other embodiments, SSD controller 40 may determine that the command may be safely aborted, at which point the command is removed from the respective internal queue. At step 68, SSD controller 40 returns a result to administrative completion queue 32 indicating whether the abort command was successful or not. At step 70, controller management module 18 fetches the result from administration completion queue 32 and reads the fetched result. At step 72, controller management module 18 returns the abort result to the device driver within the first partition 24 as a response to abort command 60. If the abort is unsuccessful and the command is executed, then results of the executed command would be returned to I/O submission queue 30 as discussed at step 58. If the abort is successful, SSD controller 40 places a result into the I/O completion queue that indicates the command was aborted. This insures that for every command fetched from I/O submission queue 30, a result is placed onto I/O completion queue 32 even if that result indicates the command was aborted.

As illustrated in FIG. 2, the administrative abort function is implemented outside of the command issue and completion path. As a result, a couple of scenarios are possible regarding whether the standard abort function is successful.

In a first case, the administrative abort command is placed on the administrative submission queue and fetched by SSD controller 40 prior to fetching of the I/O command from I/O submission queue 30. In this case, the administrative abort command is executed while the I/O command remains stored in I/O submission queue 30 (i.e., prior to fetching by SSD controller 40 and placement in internal queues 40a-40n). As a result, SSD controller 40 responds to the administrative abort command by indicating that the abort function has failed. Subsequently, when the I/O command is fetched, SSD controller 40 executes the command normally.

In a second case, SSD controller 40 fetches the administrative abort command from administrative submission queue 20 while the I/O command is residing within one of the internal queues 40a-40n. In this instance, SSD controller 40 checks internal queues 40a-40n for the I/O command to be aborted and finds the command. In response, the I/O command is in fact aborted and SSD controller 40 provides a status to administrative completion queue 22 indicating that the abort was successful.

In a third case, SSD controller 40 fetches the administrative abort command from administrative submission queue 20 while the I/O command is being executed from one of the internal queues 40a-40n. In this instance, SSD controller 40 allows the I/O command to continue executing, and returns a result to administrative completion queue 32 at step 68 indicating that the abort command failed at step 68.

As illustrated by these examples, in a number of cases the administrative abort command will be unsuccessful. This shortcoming is addressed through a modification of the NVMe interface to allow device drivers (e.g., device driver 28, device driver 34) to set a "poison bit" status flag on I/O commands placed on I/O submission queues awaiting fetching by SSD controller 40. When fetched by SSD controller 40, the "poison bit" status flag is read by SSD controller 40 and used to prevent storing of the I/O command to internal queues 40a-40n. Because this abort function is performed within the framework of the command path, without requiring intervention from controller management module 18, this abort function is referred to as a command path abort function.

FIG. 3 is a flowchart illustrating operation of a typical I/O command within the framework of the NVMe standard, as well as execution of the command path abort function (i.e., "poison bit" abort command). Continued reference is made to FIG. 1 to aid in describing the flow of operation. Execution of the I/O command is once again described with reference to first partition 24, although the same principles would apply to second partition 26 or other partitions. In addition, use of the command path abort function does not preclude use of the standard, administrative abort function in conjunction with the command path abort function.

At step 80, the I/O operation between host 12 and SSD 14 is initiated by first partition 24 placing an I/O command on I/O submission queue 30.

At step 82, first partition 24 generates a command path abort command. At step 84, in response to the command path abort command, device driver 28 sets a "poison bit" within the I/O command. Depending on the application, each I/O command is comprised of a fixed number of bits (e.g., 32, 64) which includes at least a plurality of unused, reserved bits. One of these bits is assigned the status of the "poison bit", wherein "setting" the "poison bit" simply refers to changing the state of the bit from a zero to a one (or vice versa). Because device driver 28 is responsible for placing I/O commands within I/O submission queue 30, device driver 28 is able to locate and access I/O commands previously placed within I/O submission queue for setting of the "poison bit".

At step 86, SSD controller 40 fetches the I/O command from I/O submission queue 30. At step 88, SSD controller 40 detects the set "poison bit". Detection of the "poison bit" requires SSD controller 40 to check the bit status of the bit designated as the "poison bit" in each command fetched. In response to a set "poison bit", SSD controller 40 aborts execution of the command. At step 90, SSD controller 40 returns a result to I/O completion queue 32 indicating that the abort was successful, thereby satisfying the requirement that each command fetched from an I/O submission queue results in a corresponding result being stored in an I/O completion queue. At step 92, first partition 24 fetches the result from I/O completion queue 32 and reads the returned result.

In this way, the command path abort function utilizes the command issue and completion path to execute abort commands. That is, the command path abort function does not require placing a separate abort command in the administrative submission queue, and fetching, outside of the command issue and completion path, the abort function. As a result, I/O commands yet to be fetched by SSD controller 40 may successfully be aborted. This is in contrast with the standard, administrative abort command, which fails if the abort command is fetched from administrative submission queue 20 prior to fetching the I/O command from I/O submission queue 30. As discussed above, use of the command path abort function does not preclude continued use of the administrative abort function. In fact, use of both the standard, administrative abort function and the command path abort function improves the likelihood of an abort command being successful. The administrative abort function will continue to be successful when the abort command is issued after the I/O command has been fetched from I/O submission queue 30, while the command path abort function will be successful if the abort command is issued prior to the I/O command being fetched from I/O submission queue.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of executing an abort command in a system including a host communicating with a storage device, the method comprising:
    storing an input/output (I/O) command in an I/O submission queue located in system memory;
    receiving an abort command with respect to the I/O command placed on the I/O submission queue;
    setting a "poison bit" flag within the I/O command placed on the I/O submission queue indicating that the I/O command should be aborted;
    fetching, by a storage device controller included as part of the storage device, the I/O command from the I/O submission queue;
    aborting execution of the I/O command in response to the bit indicating the I/O command should be aborted; and
    returning a result indicating the abort was successful to an I/O completion queue located in the system memory.

2. The method of claim 1, further including:
    providing the abort command to an administrative submission queue;
    fetching, by the storage device controller, the abort command from the administrative submission queue;
    checking an internal queue maintained by the storage device controller for the I/O command to be aborted and aborting execution of the I/O command if located; and
    returning a result indicating the abort was successful to an administrative completion queue located in the system memory.

3. The method of claim 1, wherein the host communicates with the storage device according to a non-volatile memory express (NVMe) standard.

4. A host computer system that interacts with a storage device, the host computer system comprising:
    an input/output (I/O) submission queue, implemented in system memory, that stores I/O commands to be fetched by a storage device controller in the storage device;
    an I/O completion queue, implemented in the system memory, that stores results provided by the storage device controller indicating execution of a I/O command; and
    a device driver, executed by a processor in the host computer system, that places I/O commands onto the I/O submission queue and reads results provided onto the I/O completion queue, wherein in response to an abort command issued by the host computer system, the device driver locates the command to be aborted within the I/O submission queue and sets an "poison bit" flag in the I/O command.

5. The host computer system of claim 4, wherein each I/O submission queue is associated with at least one completion queue.

6. The host computer system of claim 4, further including:
    a controller management module having an administrative submission queue and an administrative completion queue, wherein in response to an abort command the device driver provides the controller management module with the abort command for placement onto the administrative submission queue to be fetched by the storage device controller.

7. The host computer system of claim 4, wherein the storage device is a solid-state drive (SSD).

8. A computer system comprising:
    a host computer system having a processor and system memory, the host computer system comprising:
        an input/output (I/O) submission queue implemented in the system memory;
        an I/O completion queue implemented in the system memory; and
        a device driver, executed by a processor in the host computer system, that places I/O commands onto the I/O submission queue and reads results provided onto the I/O completion queue, wherein in response to an abort command issued by the host computer system, the device driver locates the I/O command to be aborted within the I/O submission queue and sets a "poison bit" flag in the I/O command; and
    a storage device that includes a storage device controller that implements an internal queue for storing I/O commands fetched from the I/O submission queue awaiting execution, wherein the storage device controller fetches I/O commands from the I/O submission queue and places them into the internal queue if the "poison bit" flag is not set, wherein the storage device controller provides an abort successful result to the I/O completion queue if the "poison bit" flag is set.

9. The computer system of claim 8, further including: a data bus for providing communications between the host computer system and the storage device.

10. The computer system of claim 9, wherein the data bus is a peripheral component interface express (PCIe) data bus.

11. The computer system of claim 8, wherein the host computer system further includes:
    a controller management module having an administrative submission queue and an administrative completion queue, wherein in response to the abort command issued by the computer system the device driver provides the abort command to the controller management module for placement onto the administrative submission queue to be fetched by the storage device controller.

12. The computer system of claim 11, wherein the storage device controller checks the internal queue for the I/O command to be aborted and returns an abort successful result to the administrative completion queue if the I/O command is located and aborted and returns an abort failed result to the administrative completion queue if the I/O command is not aborted.

13. The computer system of claim 8, wherein the storage device is a solid-state drive.

14. A method of operating a device driver on a host side of an interface system, the method comprising:
    receiving an input/output (I/O) command from the host computer system;
    placing the I/O command on an I/O submission queue;
    receiving an abort command from the host computer system;
    locating the I/O command within the I/O submission queue; and
    setting a "poison bit" flag within the command to be aborted.

15. The method of claim 14, wherein the interface system is a non-volatile memory express (NVMe) interface system.

16. A computer readable medium that stores instructions for implementing a device driver, wherein execution of the stored instructions by a processor implements a method for accessing a storage device, the method comprising:

receiving an input/output (I/O) command from the host computer system;

placing the I/O command on an I/O submission queue;

receiving an abort command from the host computer system;

locating the I/O command within the I/O submission queue; and setting a "poison bit" flag within the command to be aborted.

17. A storage device comprising:

memory configured to store data;

a controller configured to access the stored data based on input/output (I/O) commands, wherein the controller is further configured to detect a status of a "poison bit" flag in the I/O commands and return a result indicating the I/O command has been aborted if the "poison bit" flag is set.

18. The storage device of claim 17, wherein the controller fetches the I/O commands from an external I/O submission queue and returns the result indicating the fetched I/O command has been aborted to an external I/O completion queue.

19. The storage device of claim 17, wherein the controller further includes a plurality of internal queues for storing I/O commands to be executed, wherein the controller places the I/O command into one of the plurality of internal queues if the "poison bit" flag is not set.

20. The storage device of claim 17, wherein the storage device is a solid-state drive (SSD) and the memory is non-volatile memory.

\* \* \* \* \*